April 18, 1967 R. E. CHANCELLOR 3,314,193
LAWN EDGER
Filed May 10, 1965
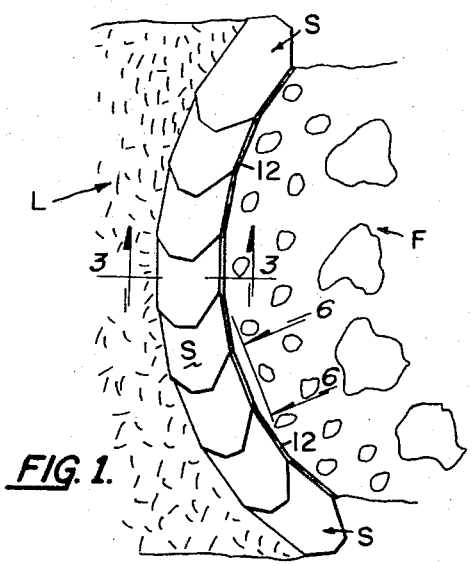
FIG. 1.
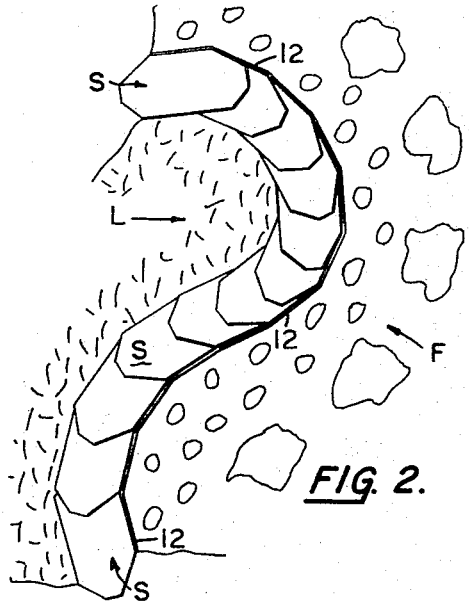
FIG. 2.
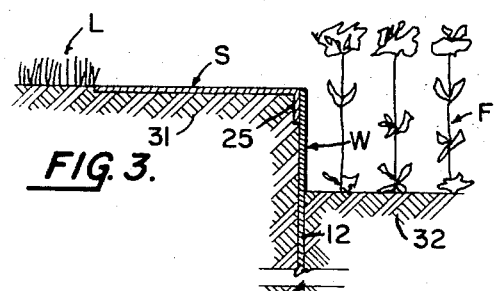
FIG. 3.
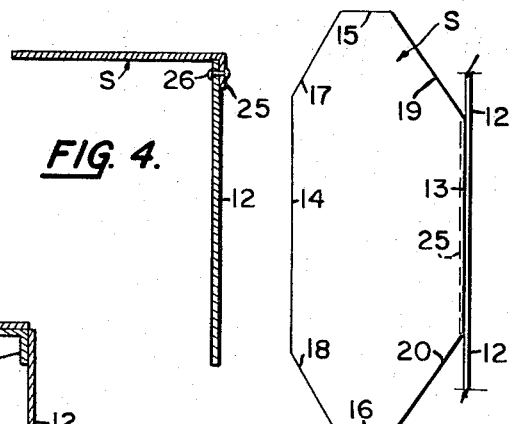
FIG. 4. FIG. 5.
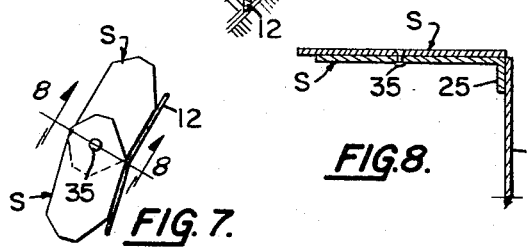
FIG. 7. FIG. 8.
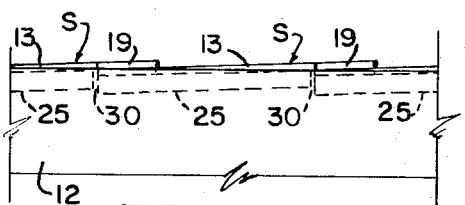
FIG. 6.
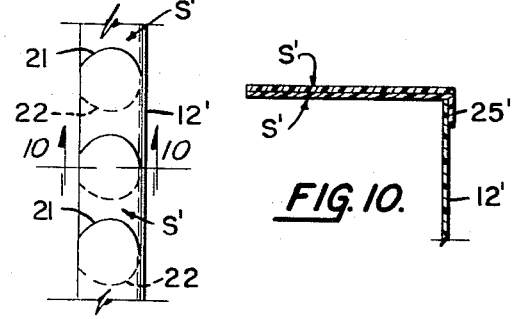
FIG. 9. FIG. 10.
INVENTOR.
ROBERT E. CHANCELLOR
BY
ATTORNEYS

United States Patent Office 3,314,193
Patented Apr. 18, 1967

3,314,193
LAWN EDGER
Robert E. Chancellor, Lakewood, Colo.
(8810 Dover Circle, Denver, Colo. 80226)
Filed May 10, 1965, Ser. No. 454,339
11 Claims. (Cl. 47—33)

This invention relates to means and devices for controlling and restricting the growth and spread of a lawn, and more particularly to devices for restricting the growth of a lawn along an edge of a garden or walkway, and as such, the invention will be referred to as improvements in lawn edge restraining devices and also specifically as a curved lawn edging strip.

Law grass not only propagates from seed, but slowly extends itself by sending forth runners from established clumps and sod. While such growth is especially desirable for filling up bare spots in a lawn, it is a nuisance at the boundary of the lawn. The edge of the lawn will continue to spread laterally and grow upon a walk or into a flower bed. To control such growth, edging strips are commonly employed, and the most common type consists of a flat metal strip which may be transversely corrugated and which is adapted to be pressed in the ground, in an upright position, to define the lawn edge. Such a strip does not completely stop the lawn growth, but it does hold it back to an extent, and it simplifies the chore of cutting away excess growth from time to time. It is not suitable in yards where barefoot children play because it may then constitute a hazard. In addition, such a strip does not permit a lawn mower to be operated along the edge and to cut clear to the strip or edge of the grass.

It has been discovered that the spreading of a lawn is generally controlled by the amount of light which strikes the ground surface, for the runner from a clump, through underground, must have light to grow a new shoot alongside a clump. It has also been discovered that, with a few exceptions, such as certain bent and Bermuda grasses, the covering of a strip of soil approximately three inches wide will effectively inhibit the spread of the lawn growth, and this has led to the development of lawn edging strips in the general form of an inverted L, with the vertical leg or strip being implanted in the soil and the horizontal leg of the strip overlying the lawn portion adjacent to the strip.

Although known, such types of lawn edgers have not been widely used; one factor in the reluctance of the public to accept such a lawn edging device lies in the fact that any structural member which is L-shaped in section cannot be easily bent around curves, such as those which commonly occur when an ornamental garden or flower bed is planted adjacent to a lawn. Accordingly, there is a real and definite need for a simplified and improved edging strip to meet this problem.

The present invention was conceived and developed with such in view, and it comprises, in essence, an inverted L-shaped lawn edging strip which, when installed, is characterized as having in section, a vertical leg and a horizontal leg outstanding from one side of the top of the vertical leg but formed in segments which are adapted to overlie both each other and the edge of the lawn adjacent to the vertical leg, with the further characteristic of being capable of being bent around a curve.

A primary object of the invention is to provide a novel and improved construction of an inverted L-shaped edging strip which is capable of being bent to form a concave or convex curvature.

Another object of the invention is to provide a curvable lawn edging strip capable of supplementing conventional, straight edging members.

Another object of the invention is to provide a novel and improved curvable lawn edging strip which may be made of resilient yieldable material, such as synthetic resins, and which, though L-shaped in section, may be flattened without injuring the components thereof and which may be provided in rolls or flat packages for compactness in storage and shipment.

Another object of the invention is to provide a novel and improved lawn edging strip which is easily bent to any selected, arcuate form and which then may be quickly, easily and rigidly affixed to the selected curvature, as by a gardener at the site of installation.

Another object of the invention is to provide a novel and improved lawn edger which will permit a lawn mower to cut the grass clear to the edge of the lawn.

Other objects of the invention are to provide a novel and improved curvable lawn edging strip which is easily formed of lightweight, low-cost material by various conventional operations which, in use, provides for a neat appearing, low cost, lightweight rigid member sufficiently strong to be capable of normally supporting the weight of people and lawn mowers and of a construction which is basically safe, should a barefoot child accidentally happen to step upon it.

With the foregoing and other objects in view, all of which more fully hereinafter appear, my invention comprises certain constructions, combinations and arrangements of parts and elements, as hereinafter described, defined in the appended claims and illustrated in preferred embodiment in the accompanying drawings, in which:

FIG. 1 is a plan view of a preferred embodiment of the improved lawn edging strip, illustrated as separating a lawn and a flower bed and with the strip being bent to conform to a curved, concave edge of a flower bed or the like;

FIG. 2 is a top plan view, similar to FIG. 1, but with the edger being bent to conform to an ogee curve at the lawn edge, to illustrate the fitting of the strip to both concave and convex curvatures of the edge of a flower bed or the like;

FIG. 3 is a transverse section, taken along the indicated line 3—3 of FIG. 1, but on an enlarged scale;

FIG. 4 is a transverse section of the edge per se, similar to FIG. 3, but illustrating a modified manner of interconnecting elements constituting the edger;

FIG. 5 is a top plan view of a fragment of the edger, also on an enlarged scale, showing only a single segment of the horizontal leg;

FIG. 6 is a fragmentary side elevation, showing a portion of the edger as taken from the indicated line 6—6 of FIG. 1, but on an an enlarged scale, with the thickness of the horizontal segments being somewhat exaggerated, and with broken lines indicating portions hidden from view;

FIG. 7 is a fragmentary, top plan view, on a scale similar to that of FIG. 1, showing one manner in which the horizontal components may be interconnected to form a rigid, curved edger;

FIG. 8 is a transverse section, taken along the indicated line 8—8 of FIG. 7, but on an enlarged scale;

FIG. 9 is a top plan view, on a scale similar to FIG. 1, of a modified embodiment of the edger; and FIG. 10 is a transverse section, taken along the indicated line 10—10 of FIG. 9, but on an enlarged scale.

Referring more particularly to the drawing, the inverted L-shaped lawn edger includes a continuous strip 12 forming a vertical wall W, as in FIG. 3, and a squamous array of flaps or segments S forming a horizontal shelf outstanding from one side of the top of the wall W, as in FIGS. 1–3. When properly set into the ground to define the edge of a lawn L, as at a flower bed F, around a tree, or the like, the wall W is implanted into the ground to its full depth at least at the lawn side thereof, and the shelf lies upon the ground surface at this lawn side. Lateral runners of sod are thus prevented from forming shoots of grass because of the absence of light under the continuous shelf formed by segments S. The dimensions of an edger suitable for this purpose may vary somewhat, but ordinarily the vertical wall W may be approximately six to eight inches high, while the width of the segments S may be approximately three to five inches. With a five inch width, for instance, there will be sufficient surface for a lawn mower wheel, even though the grass of the lawn grows out over the segments for two or three inches and thus permit the mower to cut all of the grass. It has been found that grass growing over onto the segments is an advantage, since such grass tends to hold or lock the segments in place.

It is desirable that the material forming the edger be impermeable to moisture and that the horizontal shelf be impermeable to light. Several different types of material may be used or used interchangeably, including sheet metal and selected types of synthetic resins characterized by being substantially rigid but yieldable to moderate bending actions. Polypropylene is one such type of resin because it may be loaded with pigment to provide a light proof, impermeable weather resistant material. Accordingly while certain advantages may be obtained by using sheet metal and other advantages may be obtained by using synthetic resin material, the actual choice of material is an auxiliary consideration to the paramount features of the invention itself.

While the vertical wall W is a continuous strip 12 of any desired length, the horizontal shelf is made up of a squamous alignment of the overlapping flaps or segments S of restricted proportions with each flap being individually attached to the strip at its inner edge 13. Each segment or flap S may be formed as an irregular polygon or the like, as in FIG. 5, characterized by having an outer edge 14 preferably longer than inner edge 13 and laterally disposed, preferably parallel, front and rear ends 15 and 16, respectively, which may be equal in width and spaced laterally approximately the same distance from strip 12, with the latter, of course, in a straight condition, as in FIG. 5. The front and rear outer angular edges 17 and 18, extending from the outer edge 14 to the front and rear ends, respectively, may have the same or approximately the same length and be inclined at the same or approximately the same angle to outer edge 14. However, the inner angular edges 19 and 20, respectively at the front and rear, are preferably longer than edges 17 and 18, because of the preferably greater length of outer edge 14 than inner edge 13. The front and rear ends and edges are preferably similar in length or width and position, while the angularity of edges 19 and 20 with respect to strip 12 may be on the order of 35°, as shown, but this angularity may be varied. As will be evident, strip 12 may be bent outwardly at a point at either the front or rear of inner edge 13 until angular edge 19 or 20 abuts or is in line with strip 12, thereby permitting strip 12 to follow a convex edge, as in the upper portion of FIG. 2. Also, strip 12 may be bent inwardly at each end of inner edge 13, thereby permitting the strip to follow a concave edge, as in FIG. 1 and the lower portion of FIG. 2. In each instance, the segments S will overlap to provide a flat, comparatively smooth shelf or surface on which a wheel of a lawn mower may run, so that the grass may be cut to the edge of lawn L. Of course, the overlapping segments will also deter grass from growing upwardly beneath the same and thus deter the grass from growing into the flower bed F or other area bordering the lawn.

When the edger is installed in a convex position, as in the upper portion of FIG. 2, the segments S or flaps overlap without difficulty. However, when the edger is installed in a concave position, as in FIG. 1 and the lower portion of FIG. 2, the longer outer edge 14 permits the segments S to overlap without any gaps between, particularly adjacent strip 12, while the outer angular edges 19 or 20 eliminate any sharp corners which might otherwise extend laterally from the overlapped segments. As will be evident, the ends of the segments need not be angular, but may be rounded or assume any other suitable shape to provide for a neatly appearing member which will not have undesirable edge projections when the edger is bent out of a straight alignment. Such a modified form is illustrated in FIGS. 9 and 10, in which ends 21 and 22 of segments S' are rounded to correspond generally to the edges 15, 17, 19 and 16, 18, 20 of segments S.

The inner edge 13 of each segment S is attached to the top of the continuous strip 12 in any suitable manner, so as to affix it to the strip with the segment normally outstanding laterally therefrom. Thus, the inner edge of each segment may be provided with a downturned flange 25 which may be brazed or welded to the top of the strip 12, as in FIG. 3, or which may be riveted to the strip 12, as by rivet 26 of FIG. 4. The flange 25 may abut against the strip, as illustrated in FIG. 3, or it may overlap, as illustrated in FIG. 4, such being a matter of choice when the strip and segments are formed of metal. However, when the strip and segments are formed of plastic, flange 25 may be heat welded or secured by adhesive to strip 12 and, in the latter instance, flange 25 preferably overlaps the strip 12, to protect the adhesive from the elements, as in FIG. 10.

It is to be noted that the connection of the segments to the strip will require that the segments be inclined slightly with respect to the top edge of the strip 12 to provide for the lapping of the segments when the shelf is formed by attaching the flaps to the wall, side by side, in the manner illustrated in FIG. 6. The downturned flanges 25 are preferably shorter than edges 13, so that they will be spaced apart a slight distance at the juncture points 30, as shown in FIG. 6, to permit readier inward bending of the wall strip. Since the strip 12 forming the wall is connected to the normally rigid flanges 25 of the several segments, it is free to bend only at the juncture points 30. This bending at any juncture point 30 constitutes an axis about which the adjacent segments S pivot, and the overlapping ends move together to increase the extent of the overlap, or apart to decrease the overlap. When formed of plastic or resin, as in FIGS. 9 and 10, the strip 12' will readily bend at each juncture point 30 of FIG. 6. Such bending is easily accomplished when the wall 12 of sheet metal or a resin material having properties similar to polypropylene, and it is to be noted that an aggregate of a number of small bends at a series of juncture points 30 will shape the edger to any selected curvature.

When the edger is installed, it may be bent to shape as it is placed, with the earth 31 beneath segments S placed as they are positioned. Strip 12 may be driven into the earth 32 of the flower bed F, when of metal, or a narrow trench for receiving strip 12 excavated and then filled in as or after the strip is placed therein. In the event that a more permanent installation is desired, the segments may be attached together. Thus, after the curvature of strip 12 has been established, holes may be drilled in appropriate places in the segments S and adjacent segments attached together by a suitable fastening device, such as rivet 35 of FIGS. 7 and 8. If the edger is formed of a resin material, the length of the edger can be bent to any selected curvature and the segments fixed in such a curvature by simply stapling the plates together with a common stapling machine. Or, heat welds may be used to attach the segments together or cold welds by applying a solvent between the overlapping ends, while holding the edger in position.

An advantage of the edger construction, when made of an appropriate resin material, lies in the fact that the segments may be bent upwardly, generally into the plane of the wall 12 and the edger rolled up to permit compact storage and shipment of the units until they are ready to be used.

When formed of plastic, the edger may be supplied in rolls or in lengths, shipped in flat or stacked condition. When formed of metal, the edger may be supplied in convenient lengths, such as 6 to 10 feet long, shipped in stacks in which each strip 12 overlies strip 12 of the length beneath, with the segments S of each length inside the segments attached to the strip below. Each end of strip 12 of such a length may be coterminal with the ends of inner edge 13 of the end segments or strip 12 may extend beyond the inner edges of the corresponding segments, so that the ends of strip 12 of adjacent lengths may be overlapped laterally when installed. As will be evident, whether the ends of strip 12 of adjacent lengths abut or overlap, the last segment of one length and the first segment of the next length will overlap in the same manner as adjacent segments of each length.

I have now described my invention in considerable detail; however, it is obvious that others skilled in the art can build and devise alternate and equivalent constructions which are nevertheless within the spirit and scope of my invention. Hence, I desire that my protection be limited, not by the constructions illustrated and described, but only by the proper scope of the appended claims.

What is claimed is:

1. An edging device or the like, as for maintaining a curved boundary of a lawn, comprising:
   a vertical strip; and
   a series of adjacent, overlapping horizontally extending segments attached at the inner edges thereof to the top edge of said vertical strip, the inner edges of said segments being substantially coextensive with the vertical strip and said segments having an extension at each end which underlies or overlies the adjacent segment, said end extensions being formed to provide a greater length at a position intermediate the inner and outer edges of said segment.

2. An edging device, as set forth in claim 1, wherein said segments are provided with an outer edge which has a greater length than the inner edge thereof.

3. An edging device, as set forth in claim 1, wherein the ends of said segments have an angular configuration.

4. An edging device, as set forth in claim 1, wherein the ends of said segments have a rounded configuration.

5. An edging device, as set forth in claim 1, wherein said vertical strip and said segments are formed of metal.

6. An edging device, as set forth in claim 1, wherein said segments are provided with depending flanges at the inner edge thereof for attachment to said strip.

7. An edging device, as set forth in claim 6, wherein said flanges of said segments overlap the top edge of said strip.

8. An edging device, as set forth in claim 1, wherein said vertical strip and said segments are made of resin material.

9. An edging device, as set forth in claim 8, wherein said segments are provided with flanges and said flanges are attached to said vertical strip by an adhesive.

10. An edging device or the like, as for maintaining a curved boundary of a lawn, comprising:
    (a) a vertical wall formed as a continuous longitudinally disposed strip of normally rigid, bendable material;
    (b) a squamous array of a plurality of flaps outstanding from one side of the top of the wall strip with each flap including an intermediate portion and extended end portions, with the inner edges of the intermediate portions being affixed to the top of the wall end to end and with the end extensions of each flap overlying and underlying the adjacent flaps, and wherein each end extension is formed with an angled edge commencing at the end of the inner edge and extending outwardly therefrom at a selected angle with respect to said inner edge, whereby to permit the wall to be bent at the juncture between adjacent flaps towards the flaps at not more than said angle where the angled edge of an underlying extension abuts against the wall.

11. An edging device, as set forth in claim 10, wherein the outer edge of each intermediate portion of a flap has a greater length than the inner edge thereof.

References Cited by the Examiner

UNITED STATES PATENTS

| 1,235,520 | 7/1917 | Kirfman | 47—25 |
|---|---|---|---|
| 1,798,265 | 3/1931 | McGibbon. | |

FOREIGN PATENTS 417,724  10/1934  Great Britain.

ABRAHAM G. STONE, *Primary Examiner.*

P. A. RAZZANO, *Assistant Examiner.*